(12) United States Patent
Inamo

(10) Patent No.: US 10,484,325 B2
(45) Date of Patent: Nov. 19, 2019

(54) INFORMATION PROCESSING SYSTEM

(71) Applicant: Hiroshi Inamo, Kagawa (JP)

(72) Inventor: Hiroshi Inamo, Kagawa (JP)

( * ) Notice: Subject to any disclaimer, the term of this patent is extended or adjusted under 35 U.S.C. 154(b) by 99 days.

(21) Appl. No.: 15/567,573

(22) PCT Filed: Apr. 22, 2016

(86) PCT No.: PCT/JP2016/062837
§ 371 (c)(1),
(2) Date: Oct. 18, 2017

(87) PCT Pub. No.: WO2016/171277
PCT Pub. Date: Oct. 27, 2016

(65) Prior Publication Data
US 2018/0115506 A1 Apr. 26, 2018

(30) Foreign Application Priority Data
Apr. 22, 2015 (JP) ................................ 2015-087946

(51) Int. Cl.
*H04L 12/58* (2006.01)
*H04L 29/12* (2006.01)
(Continued)

(52) U.S. Cl.
CPC .............. *H04L 51/28* (2013.01); *H04L 61/20* (2013.01); *G06F 21/10* (2013.01); *G06Q 30/02* (2013.01); *H04L 61/6004* (2013.01)

(58) Field of Classification Search
CPC ......... H04L 51/18; H04L 51/28; G06Q 30/02; G06Q 30/0242; G06Q 30/0635; G06F 21/10; G06F 21/608
(Continued)

(56) References Cited

U.S. PATENT DOCUMENTS

| 5,694,546 A | * | 12/1997 | Reisman | ................... G06F 8/65 705/27.1 |
| 7,366,758 B2 | * | 4/2008 | Kasatani | ................. H04L 51/18 379/100.08 |

(Continued)

FOREIGN PATENT DOCUMENTS

| JP | 2003-224677 A | 8/2003 |
| JP | 2003-337905 A | 11/2003 |

(Continued)

OTHER PUBLICATIONS

International Search Report issued in corresponding International Patent Application PCT/JP2016/062837, dated Jun. 14, 2016 with English Translation.

*Primary Examiner* — James N Fiorillo
(74) *Attorney, Agent, or Firm* — McDermott Will & Emery LLP

(57) ABSTRACT

An information processing system according to an embodiment of the present invention includes a communication terminal, and a plurality of identifier information transmitting apparatuses. The identifier information transmitting apparatuses are installed in a plurality of respective locations, and each of the identifier information transmitting apparatuses transmits a different piece of identifier information. The communication terminal receives the identifier information transmitted from the identifier information transmitting apparatuses, generates an email address including the identifier information, and acquires an email that is addressed to the generated email address.

8 Claims, 6 Drawing Sheets

(51) Int. Cl.
  *G06Q 30/02* (2012.01)
  *G06F 21/10* (2013.01)
(58) Field of Classification Search
  USPC ............ 709/206, 227; 705/26.81, 39; 726/5
  See application file for complete search history.

(56) References Cited

U.S. PATENT DOCUMENTS

| | | | | |
|---|---|---|---|---|
| 7,831,668 | B2* | 11/2010 | Deeds | G06Q 10/107 709/206 |
| 8,150,925 | B2* | 4/2012 | Zimmers | G08B 27/005 709/206 |
| 2003/0216963 | A1* | 11/2003 | Ishiwaka | G06Q 30/02 705/14.41 |
| 2007/0156505 | A1* | 7/2007 | Agassi | G06Q 10/0637 705/14.41 |
| 2009/0243852 | A1* | 10/2009 | Haupt | G01W 1/00 340/541 |
| 2009/0262668 | A1* | 10/2009 | Hemar | G06Q 30/02 370/260 |
| 2009/0307318 | A1* | 12/2009 | Chappell | G06Q 10/109 709/206 |
| 2010/0057872 | A1* | 3/2010 | Koons | G06Q 30/02 709/206 |
| 2010/0313250 | A1* | 12/2010 | Chow | H04L 63/08 726/5 |
| 2011/0252146 | A1* | 10/2011 | Santamaria | H04M 7/0057 709/227 |
| 2011/0320246 | A1* | 12/2011 | Tietzen | G06Q 30/02 705/14.4 |
| 2014/0006158 | A1* | 1/2014 | Cooper | G06Q 30/02 705/14.56 |
| 2014/0366104 | A1* | 12/2014 | Nishida | G06F 21/608 726/5 |
| 2016/0063608 | A1* | 3/2016 | Hawilo | H04W 4/21 705/26.81 |
| 2017/0161728 | A1* | 6/2017 | Satyanarayan | G06Q 20/20 |
| 2018/0032997 | A1* | 2/2018 | Gordon | G06Q 20/3224 |

FOREIGN PATENT DOCUMENTS

| | | |
|---|---|---|
| JP | 2005-115726 A | 4/2005 |
| JP | 2007-304907 A | 11/2007 |
| JP | 2009-051641 A | 3/2009 |

* cited by examiner

FIG.4

| IDENTIFIER INFORMATION | | | ATTRIBUTE INFORMATION | | | NUMBER OF ADDRESSES |
|---|---|---|---|---|---|---|
| FIELD X | FIELD Y | FIELD Z | ATTRIBUTE A | ATTRIBUTE B | ... | |
| x0001 | y0001 | z0001 | ... | ... | ... | 192 |
| x0001 | y0001 | z0002 | ... | ... | ... | 352 |
| ⋮ | ⋮ | ⋮ | ⋮ | ⋮ | ⋮ | ⋮ |

FIG.5

| DELIVERY ID | PROVIDED INFORMATION | DELIVERY COUNT | ATTRIBUTE INFORMATION | INFORMATION PROVIDING ADDRESS |
|---|---|---|---|---|
| AD001 | ... | ... | ... | ... |
| AD002 | ... | ... | ... | ... |
| ⋮ | ⋮ | ⋮ | ⋮ | ⋮ |

INFORMATION PROCESSING SYSTEM

CROSS REFERENCE

This application is the U.S. National Phase under 35 U.S.C. § 371 of International Application No. PCT/JP2016/062837, filed on Apr. 22, 2016, which claims the benefit of Japanese Application No. 2015-087946, filed on Apr. 22, 2015, the entire contents of each are hereby incorporated by reference.

FIELD

The present invention related to an information processing system.

BACKGROUND

Conventionally known is an information processing system storing therein information to be delivered, in a manner associated with an area within which the information is to be delivered, and delivering the information to a communication terminal when the communication terminal is located within the delivery area (see Patent Literature 1, for example).

CITATION LIST

Patent Literature

Patent Literature 1: Japanese Laid-open Patent Application No. 2003-337905

SUMMARY

Technical Problem

Such a conventional information processing system, however, requires capabilities for detecting or acquiring the position of the communication terminal, and for determining whether the communication terminal is located within the delivery area. Therefore, it might not be sometimes easy to construct an information delivery system.

The present invention is made in consideration of the above, and an object of the present invention is to provide an information processing system for enabling a system to be constructed easily.

Solution to Problem

In order to solve the above problem and to achieve a purpose, an information processing system according to an embodiment includes a communication terminal and a plurality of identifier information transmitting apparatuses that are installed in a plurality of respective locations, and each of which transmits a different piece of identifier information. The communication terminal includes an identifier information receiving unit that receives the identifier information transmitted from the identifier information transmitting apparatuses, an address generating unit that generates an email address including the identifier information received by the identifier information receiving unit, and a provided information acquiring unit that acquires an email that is addressed to the email address generated by the address generating unit.

Advantageous Effects of Invention

The information processing system according to an embodiment of the present invention enables a system to be constructed easily, advantageously.

BRIEF DESCRIPTION OF DRAWINGS

FIG. 4 is a schematic illustrating an example of an attribute information mapping table.

FIG. 5 is a schematic illustrating an example of a provided information table.

DESCRIPTION OF EMBODIMENTS

An information processing system according to some embodiments of the present invention will now be explained in detail with reference to some drawings. The embodiments are, however, not intended to limit the scope of the present invention in any way.

1. Outline of Information Processing Executed in Information Processing System

Figure 1:
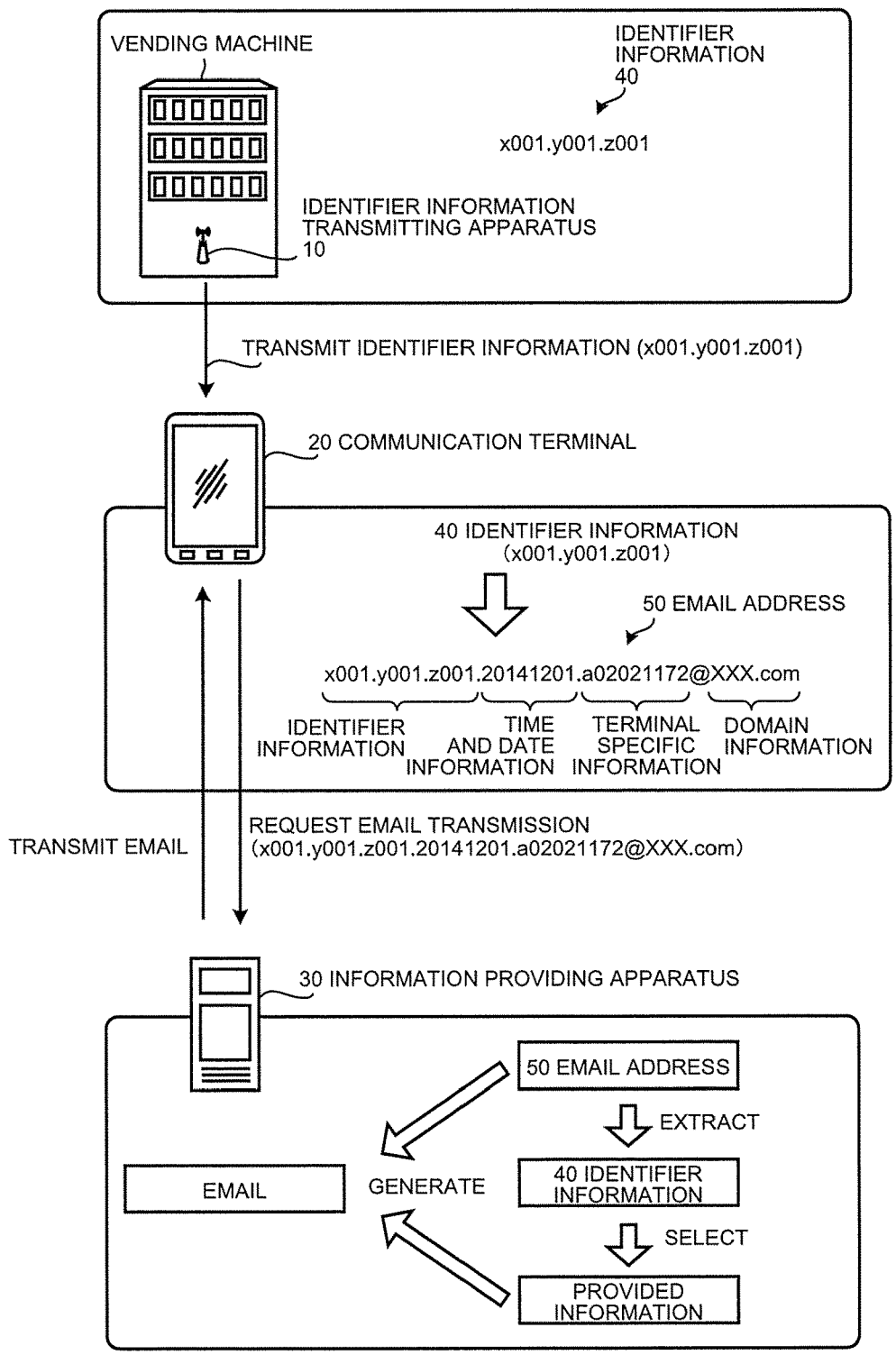
FIG. 1 is a schematic illustrating an information processing method executed in an information processing system according to an embodiment of the present invention.

FIG. 1 is a schematic illustrating an information processing method executed in an information processing system according to an embodiment of the present invention. As illustrated in FIG. 1, this information processing system 1 according to the embodiment includes an identifier information transmitting apparatus 10, a communication terminal 20, and an information providing apparatus 30. In the information processing system 1, the identifier information transmitting apparatus 10 and the communication terminal 20 are provided in plurality; however the example in FIG. 1 illustrates only one for each.

The identifier information transmitting apparatus 10 stores therein identifier information 40, and transmits the identifier information 40 to the communication terminal 20 via wireless communication such as Bluetooth (registered trademark) or radio frequency identifier (RFID). The identifier information 40 is information for identifying the identifier information transmitting apparatus 10, and is information that is unique to the identifier information transmitting apparatus 10. In the example illustrated in FIG. 1, the identifier information transmitting apparatus 10 is installed internal of an unattended servicing apparatus such as a vending machine; however the identifier information transmitting apparatus 10 may be installed in an apparatus inside of a store, or an outdoor apparatus.

The communication terminal 20 receives the identifier information 40 transmitted from the identifier information transmitting apparatus 10, and generates an email address 50 based on the received identifier information 40. In the example illustrated in FIG. 1, the email address 50 includes the identifier information 40, time and date information, terminal specific information, and domain information. The time and date information represents the time and the date when the email address 50 is generated. The terminal specific information is identification information specific to the communication terminal 20. The domain information is information indicating the name of a domain to which the information providing apparatus 30 belongs, for example.

The communication terminal 20 transmits an email transmission request including the email address 50, to the information providing apparatus 30, and receives an email that is addressed to the email address 50, from the information providing apparatus 30. The communication terminal 20 displays the received email on the display unit. The email address 50 may be a temporary email address, for example. In such a case, the communication terminal 20 may delete the email address 50 after a predetermined time period (such as three days) elapses, for example.

In the manner described above, the information processing system 1 can provide information to the communication terminal 20 having entered the wirelessly communicable range of the identifier information transmitting apparatus 10 easily, via an email using the email address 50 that is based on the identifier information 40 of the identifier information transmitting apparatus 10. Therefore, a system can be constructed more easily, compared with a system that determines whether the communication terminal 20 is located within the range where the information is to be provided.

The information providing apparatus 30 stores therein provided information that is provided by, for example, an information provider (such as an advertiser or a government), in a manner directly or indirectly associated with the identifier information 40. The information providing apparatus 30 extracts the identifier information 40 from the email address 50 included in the email transmission request, and transmits an email including the provided information that is associated with the extracted identifier information 40, to the communication terminal 20. The provided information includes characters, a still image, or a video, for example. The provided information is information representing an advertisement of a product or a service, for example, when the information provider is an advertiser, and is information related to disasters or government activities, for example, when the information provider is a government.

2. Information Processing System 1

Figure 2:
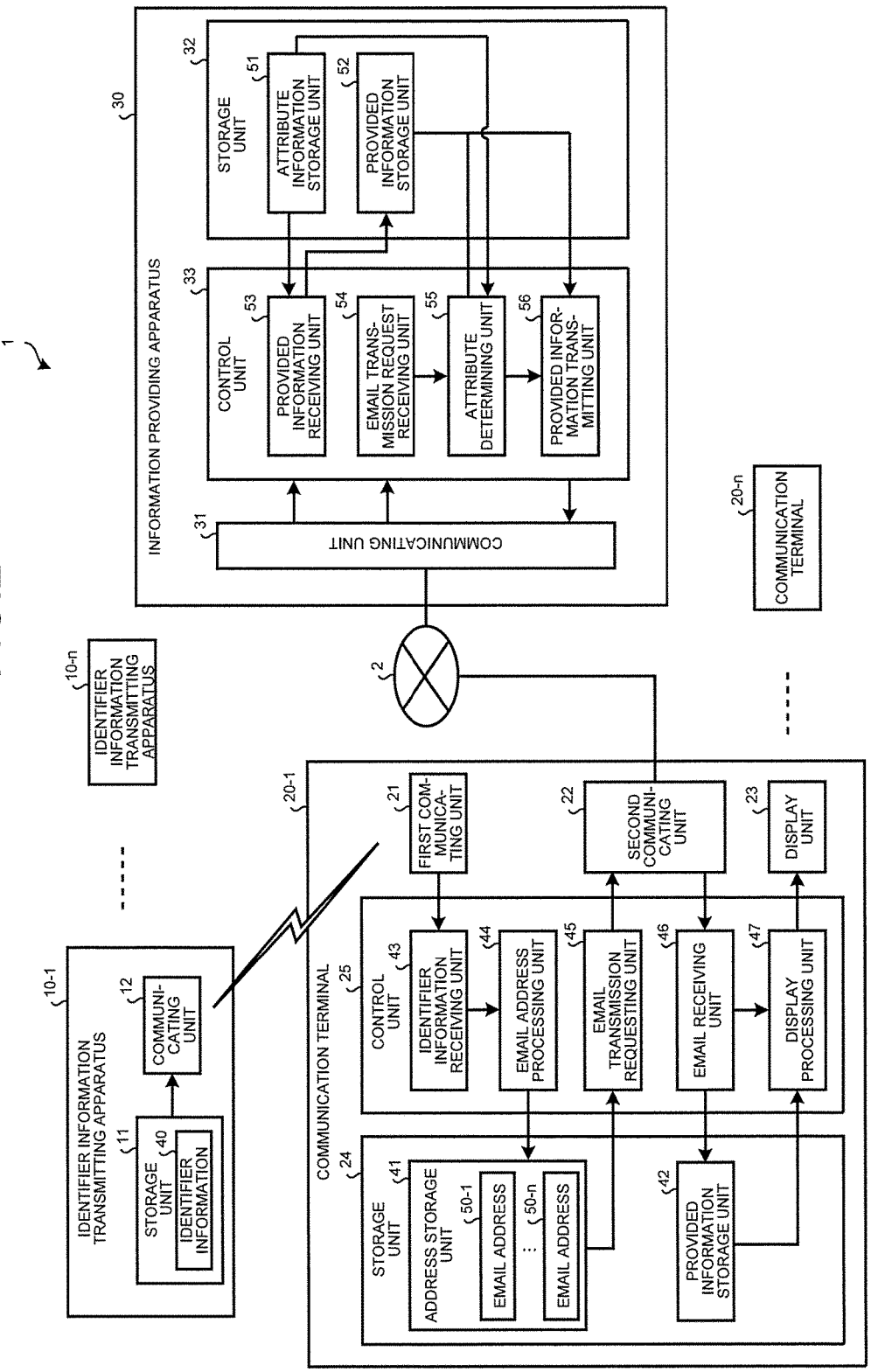
FIG. 2 is a schematic illustrating a configuration of the information processing system according to the embodiment.

The information processing system 1 according to the embodiment will now be explained specifically. FIG. 2 is a schematic illustrating a configuration of the information processing system 1 according to the embodiment.

As illustrated in FIG. 2, the information processing system 1 includes a plurality of identifier information transmitting apparatuses 10-1 to **10-*n*, a plurality of communication terminals 20-1 to 20-*n*, and the information providing apparatus 30. The communication terminals 20 and the information providing apparatus 30 exchange information over a communication network 2. In the explanation below, any one or all of the identifier information transmitting apparatuses 10-1 to 10-*n* is/are referred to as the identifier information transmitting apparatus(es) 10, and any one or all of the communication terminals 20-1 to 20-*n* is/are referred to as the communication terminal(s) 20**.

2.1. Identifier Information Transmitting Apparatus 10

The identifier information transmitting apparatus 10 includes a storage unit 11 and a communicating unit 12. The storage unit 11 stores therein the identifier information 40 that is unique to the identifier information transmitting apparatus 10. The communicating unit 12 periodically transmits the identifier information 40 stored in the storage unit 11 (once every second, for example) over wireless communication such as Bluetooth or RFID. The identifier information transmitting apparatus 10 may store the identifier information 40 received by the communicating unit 12, in the storage unit 11.

The identifier information 40 includes, for example, a field X, a field Y, and a field Z. The field X contains identifier information of the operator of the installed apparatus, or of the store where the apparatus is installed, for example. The field Y contains identifier information of the location where the apparatus is installed, and the field Z includes identifier information of the product being sold. When the identifier information 40 is the identifier information according to Bluetooth Low Energy (LE), the field X corresponds to the "UUID (organization)", the field Y corresponds to "major (grouping)", and the field Z corresponds to "minor (individual identifier)".

2.2. Communication Terminal 20

The communication terminal 20 includes a first communicating unit 21, a second communicating unit 22, a display unit 23, a control unit 25, and a storage unit 24. The communication terminal 20 also includes an operation unit for allowing a user not illustrated to operate the communication terminal 20.

The first communicating unit 21 receives the identifier information 40 transmitted from the identifier information transmitting apparatus 10 over the wireless communication such as Bluetooth or RFID. The first communicating unit 21 is also capable of receiving the identifier information 40 over the wire. The second communicating unit 22 is a communicating unit that communicates wirelessly or over the wire, and exchanges information with the information providing apparatus 30 over the communication network 2 wirelessly or over the wire. The display unit 23 is a liquid crystal display, for example, and displays the information acquired from the information providing apparatus 30, for example.

The storage unit 24 includes an address storage unit 41, and a provided information storage unit 42. The address storage unit 41 stores therein a plurality of email addresses 50-1 to **50-*n* generated by the control unit 25. The provided information storage unit 42 stores therein the information transmitted from the information provider. Hereinafter, the email addresses 50-1 to 50-*n* are referred to as email addresses 50**.

The control unit 25 includes a central processing unit (CPU) and a random access memory (RAM), and functions as an identifier information receiving unit 43, an email address processing unit 44 (an example of an address generating unit), an email transmission requesting unit 45, an email receiving unit 46 (an example of a provided information acquiring unit), and a display processing unit 47, by causing the CPU or the like to execute an information processing program acquired from the information providing apparatus 30, for example, via the second communicating unit 22. The control unit 25 causes the storage unit 24 to function as the address storage unit 41 and the provided information storage unit 42, by executing the information processing program.

Figure 3:
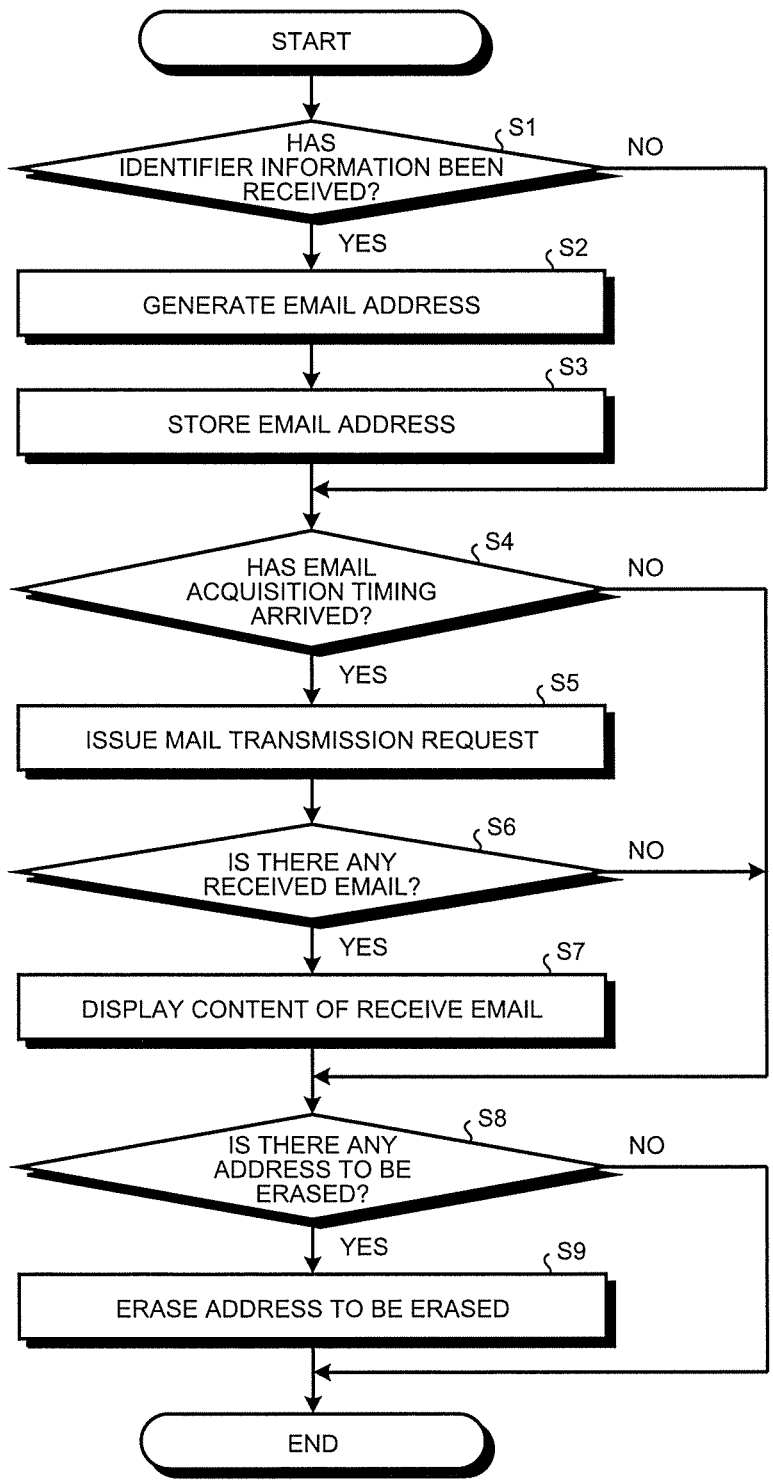
FIG. 3 is a flowchart illustrating information processing performed by a communication terminal illustrated in FIG. 2.

Information processing executed by the control unit 25 will now be explained with reference to FIG. 3. FIG. 3 is a flowchart illustrating the information processing executed in the communication terminal 20, and is executed repeatedly by the control unit 25.

As illustrated in FIG. 3, the identifier information receiving unit 43 in the control unit 25 determines whether the identifier information 40 has been received from the identifier information transmitting apparatus 10 via the first communicating unit 21 (Step S1). If the identifier information 40 has been received (Yes at Step S1), the email address processing unit 44 generates the email address 50 based on the received identifier information 40 (Step S2), and stores the generated email address 50 in the address storage unit 41 (Step S3).

If the email address 50 including the identifier information 40 acquired at Step S1 has already been stored in the address storage unit 41, the email address processing unit 44 may update the email address 50 by overwriting the email address stored in the address storage unit 41 with the email address 50 generated at Step S2. In such a case, when the identifier information receiving unit 43 receives the same identifier information 40, the email address processing unit 44 may generate the email address 50 appended with information indicating a reception count indicating the number of times the same identifier information 40 has been received. If the identifier information receiving unit 43 receives the same identifier information 40 after the email address 50 corresponding to the received identifier information 40 is deleted from the address storage unit 41, the email address processing unit 44 may start by setting one to the reception count.

The email address processing unit 44 generates the email address 50 including the identifier information 40, the time and date information, and the terminal specific information, and the domain information, for example, as illustrated in FIG. 1, and stores the email address 50 in the address storage unit 41. The terminal specific information may be unique identification information included in the information processing program, for example. Furthermore, the email address 50 is not limited to the example illustrated in FIG. 1, and does not necessarily include the time and date information, or may include information in units of minutes and seconds, for example. The first communicating unit 21 may also detect the strength of the electromagnetic waves over which the identifier information 40 is transmitted, and determine the distance from the identifier information transmitting apparatus 10 (hereinafter, referred so as a proximity distance) in multiple stages. The email address processing unit 44 may also include the information of the proximity distance determined in the manner described above, in the email address 50.

By causing the control unit 25 to execute the information processing program, users can register user information (such as sex, a date of birth, or a postal code). The control unit 25 stores the information entered by the user in an internal storage unit (not illustrated), and the email address processing unit 44 may include the user information in the email address 50.

If the process at Step S3 is completed, or if the identifier information 40 has not been received (No at Step S1), the email transmission requesting unit 45 determines whether an email acquisition timing has arrived (Step S4). The email acquisition timing is the timing for acquiring the identifier information 40 and generating the email address 50, for example, and this timing occurs periodically (for example, once every day) (hereinafter, referred to as periodic timing). The email acquisition timing may be changed depending on the reception count, or the proximity distance. For example, the email transmission requesting unit 45 may use a shorter period of the periodic timing when the reception count is greater, or when the proximity distance is shorter. Instead of the reception count, a frequency at which the same identifier information 40 is received within a predetermined period may also be used.

If the email acquisition timing has arrived (Yes at Step S4), the email transmission requesting unit 45 issues an email transmission request including the email address 50 stored in the address storage unit 41 (Step S5), and the email receiving unit 46 determines whether there is any received email (Step S6). If there is some received email (Yes at Step S6), the email receiving unit 46 stores the receive email in the provided information storage unit 42. The display processing unit 47 displays the content of the received email having stored in the provided information storage unit 42, onto the display unit 23 (Step S7).

If the process at Step S7 is completed, if the email acquisition timing has not arrived yet (No at Step S4), or if there is no received email (No at Step S6), the email address processing unit 44 determines whether there is any email address 50 to be erased (Step S8). The email address processing unit 44 determines, as an email address to be erased, the email address 50 for which a predetermined time period (such as three days) has elapsed from when the email address 50 has been generated, for example.

If there is any email address 50 to be erased (Yes at Step S8), the email address processing unit 44 erases the email address 50 to be erased by deleting the address from the address storage unit 41 (Step S9). In this manner, the email address processing unit 44 can use the email address 50 as a temporary email address. If the process at Step S9 is completed, or if there is no email address 50 to be erased (No at Step S8), the control unit 25 ends the process illustrated in FIG. 3.

The email address processing unit 44 may use a longer time period as the time before an email address is erased from when the email address is generated (hereinafter, referred to as an erasing time period), for example, when the reception count described above is greater. In this manner, the possibility of the email address 50 including the identifier information 40 that is frequently received being erased can be reduced. Furthermore, the email address processing unit 44 may also use a longer erasing time period, when the proximity distance is shorter, for example.

2.3. Information Providing Apparatus 30

The information providing apparatus 30 includes a communicating unit 31, a storage unit 32, and a control unit 33, as illustrated in FIG. 2. The communicating unit 31 is a communicating unit that communicates wirelessly or over the wire, and exchanges information with the communication terminal 20 over the communication network 2 wirelessly or over the wire.

The storage unit 32 includes an attribute information storage unit 51 and a provided information storage unit 52. The attribute information storage unit 51 stores therein an identifier apparatus attribute in a manner associated with the identifier information 40. The identifier apparatus attribute is attribute information of the identifier information transmitting apparatus 10, and information such as the location where the identifier information transmitting apparatus 10 is installed (such as the geographical address at which the apparatus is installed, the type or the manufacturer of the apparatus, or the type or the operator of the store in which the apparatus is installed), and information of the product or the service sold by the installed apparatus or by the store in which the apparatus is installed (hereinafter, referred to as a product sold).

FIG. 4 is a schematic illustrating an example of an attribute information mapping table. As illustrated in FIG. 4, the attribute information mapping table is information mapping the identifier information 40, corresponding to each of the identifier information transmitting apparatuses 10, to the attribute information and the number of addresses. Attribute information A illustrated in FIG. 4 is information related to the location where the identifier information transmitting apparatus 10 is installed, for example. Attribute information B is information related to the product sold, for example. The attribute information is not limited to the information related the installation location or the information related to the product sold, however may be information such as information related to the proximity distance, a time period of day in which the communication terminal 20 comes to proximity, information of the sex, information of the date of birth, information of the postal code, or information of the reception count. The number of addresses represents the effective number of email addresses 50 to which an email can be transmitted, and set by the control unit 33, for example.

The provided information storage unit 52 stores therein a delivery ID, provided information, a delivery count, and attribute information, in a manner associated with one another. FIG. 5 is a schematic illustrating an example of the provided information table. As illustrated in FIG. 5, the provided information table is information mapping the delivery ID, the provided information, the delivery count, the attribute information, and an information providing address to one another. The delivery ID is identification information given to a piece of provided information. The provided information is information to be delivered (for example, information including a text or an image). The delivery count represents the number of communication terminals 20 to which the provided information is to be delivered. The attribute information is the identifier apparatus attribute corresponding to the identifier information transmitting apparatus 10 for which the provided information is delivered. The information providing address is an email address notified to the information provider, and information included in an email (e.g., in the body of the email, or as an attachment file) having the information providing address as the source address is set to be the provided information.

The control unit 33 includes a CPU, a RAM, and the like, and functions as a provided information receiving unit 53, an email transmission request receiving unit 54, an attribute determining unit 55, and a provided information transmitting unit 56, by causing the CPU or the like to execute the information providing program stored in the storage unit 32. The control unit 33 also causes the storage unit 32 to function as the attribute information storage unit 51 and the provided information storage unit 52, by executing the information providing program.

Figure 6:
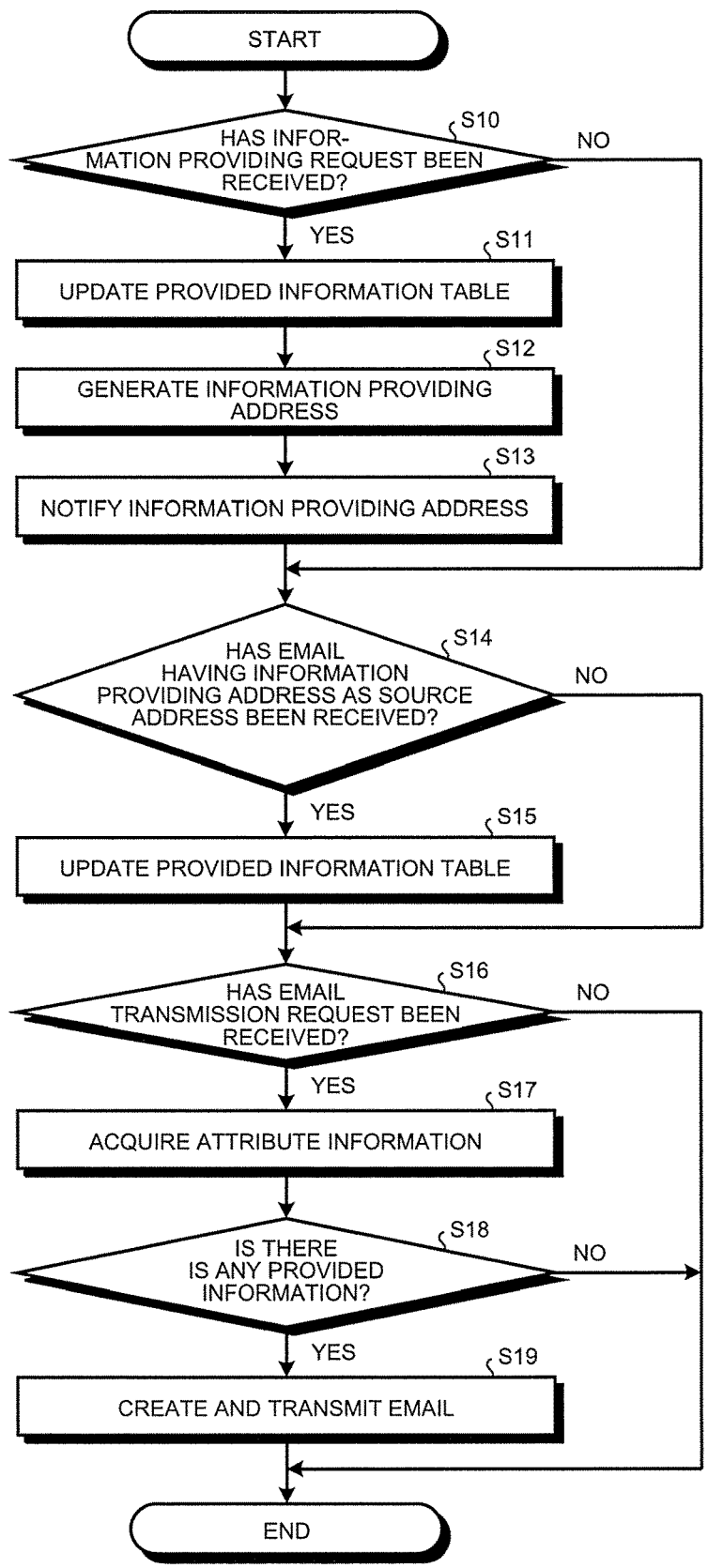
FIG. 6 is a flowchart illustrating information processing performed by an information providing apparatus illustrated in FIG. 2.

Information processing performed by the control unit 33 will now be explained with reference to FIG. 6. FIG. 6 is a flowchart illustrating the information processing performed by the information providing apparatus 30, and is executed repeatedly by the control unit 33.

As illustrated in FIG. 6, the provided information receiving unit 53 determines whether an information providing request has been received via the communicating unit 31, from a terminal device (not illustrated) belonging to the information provider (Step S10). The information providing request includes information representing the attribute information and the delivery count, for example. If the information providing request has been received (Yes at Step S10), the provided information receiving unit 53 updates the provided information table, by setting the information included in the information providing request to the provided information table (Step S11).

The provided information receiving unit 53 then generates an information providing address corresponding to the received information providing request (Step S12), and notifies the terminal device belonging to the information provider, of the information providing address (Step S13). The provided information receiving unit 53 also sets the information providing address to the provided information table, in a manner associated with the information included in the information providing request received at Step S10. The provided information receiving unit 53 may generate an email address including information allowing the attribute information to be identified (such as the characters "vending machine of a company A" or "the name of the delivery area", or abbreviations thereof) included in the information providing request, as the information providing address. In this manner, the information provider can easily identify the target to which the information is to be delivered, using the email address.

If the information providing request has not been received (No at Step S10), or if the process at Step S13 is completed, the provided information receiving unit 53 determines whether an email (hereinafter, referred to as a provided information email) having the information providing address as the source address has been received (Step S14). If the provided information email has been received (Yes at Step S14), the provided information receiving unit 53 updates the provided information table, by setting the provided information included in the provided information email to the provided information table, in a manner associated with the information providing address included in the provided information email (Step S15). The information of the delivery time period of day or the information of the delivery count may be included in the body of the provided information email, and the provided information may be included as an attachment file. In such a case, the provided information receiving unit 53 sets the information of the delivery time period of day or the information of the delivery count, included in the provided information email, to the provided information table.

If the process at Step S15 is completed, or if the provided information email has not been received (No at Step S14), the email transmission request receiving unit 54 determines whether an email transmission request has been received from the communication terminal 20 (Step S16). If an email transmission request has been received (Yes at Step S16), the attribute determining unit 55 identifies the identifier information 40 included in the email address 50 that is included in the email transmission request, and acquires the attribute information corresponding to the identified identifier information 40 from the attribute information storage unit 51 (Step S17).

The provided information transmitting unit 56 determines whether there is any provided information corresponding to the attribute information (Step S18). If some provided information corresponding to the attribute information acquired at Step S17 is set in the provided information table, for example, the provided information transmitting unit 56 determines that there is some provided information corresponding to the attribute information. If the provided information transmitting unit 56 determines that there are some provided information corresponding to the attribute information (Yes at Step S18), the provided information transmitting unit 56 acquires the provided information corresponding to the attribute information from the provided information table, and generates an email having the acquired provided information as the body of the email or an attachment file, and transmits the email to the communication terminal 20 having issued the email transmission request (Step S19).

The provided information transmitting unit 56 does not generate an email for the provided information having already been transmitted, based on the terminal specific information included in the email address 50. In this manner, it is possible to suppress the same provided information from being transmitted to the same communication terminal 20. To achieve this goal, the provided information transmitting unit 56 stores, in the storage unit 32, the terminal specific information of the communication terminal 20 to which the provided information is transmitted in a manner associated with the provided information. It is also possible not to cause the provided information transmitting unit 56 to generate an email, when the number of communication terminals 20 to which a piece of provided information has been delivered has reached the delivery count that is set for each piece of provided information in the provided information table, for example.

If the process at Step S19 is completed, if an email transmission request has not been received (No at Step S16), or if there is no provided information corresponding to the attribute information (No at Step S18, the control unit 33 ends the process illustrated in FIG. 6.

In the manner described above, the information providing apparatus 30 can transmit the provided information belonging to the information provider, to the communication terminal 20 having entered the range of wireless communication covered by the identifier information transmitting apparatus 10 corresponding to the attribute information designated by the information provider. Therefore, the information provider can easily identify the communication terminals to which the information is to be provided.

Furthermore, the information providing apparatus 30 can identify the identifier information 40 for which the provided information is to be provided, based on the provided information and the designated attribute information received from the information provider, and generate an email that is addressed to the identified email address 50 including the identifier information 40. Because the information provider can provide the information by selecting the identifier apparatus attribute, the information provider can provide information easily.

Furthermore, because the information provider can provide information to the communication terminal 20 by transmitting a provided information email having the information providing address as the source address, the information can be even more easily provided. Furthermore, because the operator of the information processing system 1 can charge every time the provided information email is received, the charging process can be simplified.

3. Modification

The configuration and the operation of the information processing system 1 according to the embodiment are not limited to those described above. For example, the control unit 33 in the information providing apparatus 30 may generate an email that is addressed to an email address including the identifier information 40 for which the information is to be provided, and store the email in the storage unit 32, in advance. In such a case, if an information providing request is newly received at Step S10, the attribute determining unit 55 may acquire the attribute information, and the provided information transmitting unit 56 may generate an email (excluding the part of the destination email address) including the newly received provided information. In such a case, upon receiving the email transmission request, the provided information transmitting unit 56 acquires the identifier information 40 included in the email address 50 from the email transmission request, acquires the email corresponding to the acquired identifier information 40 from the storage unit 32, adds the destination email address to the email, and transmits the email to the communication terminal 20.

Furthermore, in the embodiment described above, the communication terminal 20 erases the email address 50 for which a predetermined time period has elapsed; however the control unit 33 in the information providing apparatus 30 may cause the communicating unit 31 to transmit a request for erasing the email address 50 for which a predetermined time period has elapsed, to the communication terminal 20. In such a case, the control unit 25 in the communication terminal 20 can erase the email address 50 corresponding to the erasing request from the address storage unit 41. The control unit 33 in the information providing apparatus 30 may also ignore the email transmission request including the email address 50 for which a predetermined time period has elapsed. The control unit 33 determines whether the predetermined time period has elapsed based on the time and day information included in the email address 50, in the same manner as the control unit 25 does, for example.

Furthermore, in the embodiment described above, the email address 50 is stored in the address storage unit 41 in the communication terminal 20; however the identifier information 40 may be stored in the storage unit 24. In such a case, the control unit 25 may generate an email address, and issue the email transmission request, at the email acquisition timing. The communication terminal 20 may be provided with a position detector detecting the position of the communication terminal 20 (such as the latitude and longitude), and the control unit 25 may include the information of the position detected at the periodic timing by the position detector (hereinafter, referred to as position information) in the email address 50, for example. In this manner, the control unit 33 in the information providing apparatus 30 can select the provided information based on the current position information, in addition to the identifier information 40. The information provider may set information indicating the positions to which the provided information is to be delivered, as the designated attribute information.

Furthermore, in the embodiment described above, the identifier information transmitting apparatus 10 transmits the identifier information 40 periodically; however the identifier information transmitting apparatus 10 may also transmit the identifier information 40 in response to a request from the apparatus in which the identifier information transmitting apparatus 10 is housed. For example, in a configuration in which the identifier information transmitting apparatus 10 is internalized in a vending machine, the vending machine may request the identifier information transmitting apparatus 10 to transmit the identifier information 40 at the timing at which a product is purchased from the vending machine. In this manner, the information can be transmitted only to users who purchased a product from the vending machine.

The control unit 25 may encrypt the identifier information 40 or the email address 50 to be stored in the storage unit 24 so that security can be improved. The control unit 25 may also transmit an email transmission request including the encrypted identifier information 40 or email address 50 so that the security can be improved. In such a case, the information providing apparatus 30 performs the decryption. Furthermore, if the domain of the email address belongs to another email server, the control unit 33 in the information providing apparatus 30 may also forward the generated email to the email server.

Explained above in the embodiment is an example in which the information provider is an advertiser or a government; however the information provider may be an employer of users receiving the provided information. In such a case, information corresponding to each segment, such as office, department, or division, may be set as the identifier information 40, and the identifier information transmitting apparatus 10 is installed to each of such segments such as the offices, the departments, or the divisions. In such a case, for example, information corresponding to each of the segments such as the offices, the departments, or the divisions, can be delivered appropriately, by providing the information of the corresponding segment to the communication terminal 20 receiving the identifier information 40 at a reception frequency equal to or higher than a predetermined threshold.

Furthermore, when the information provider is the operator of a hospital or a care home, for example, the identifier information 40 may be set correspondingly to each patient or each person to be cared, and the identifier information transmitting apparatus 10 may be installed in the room of a patient or a person to be cared (for example, a patient room in a hospital). In such a case, the information providing apparatus 30 can provide medical examination information related to the patient (including, for example, an examination record, a record of check-ups, surgical findings, an X-ray photograph, or a nursing record) or care information related to the person to be cared, to the communication terminal 20.

When the information provider is the employer of users receiving the provided information (e.g., the operator of a company, a hospital, or a care home), and the users receiving the provided information are the employees (such as workers in the company, physicians, nurses, or caregivers), it is preferable to prevent anyone other than the employees from gaining the information using the communication terminal 20.

To address this issue, for example, it is possible to permit a communication terminal 20A to receive information from the information providing apparatus 30 only if the communication terminal 20A is receiving user identifier information (hereinafter, referred to as user identifier information) transmitted by a user information transmitting apparatus 60 carried by an employee (hereinafter, simply referred to as a user).

Figure 7:
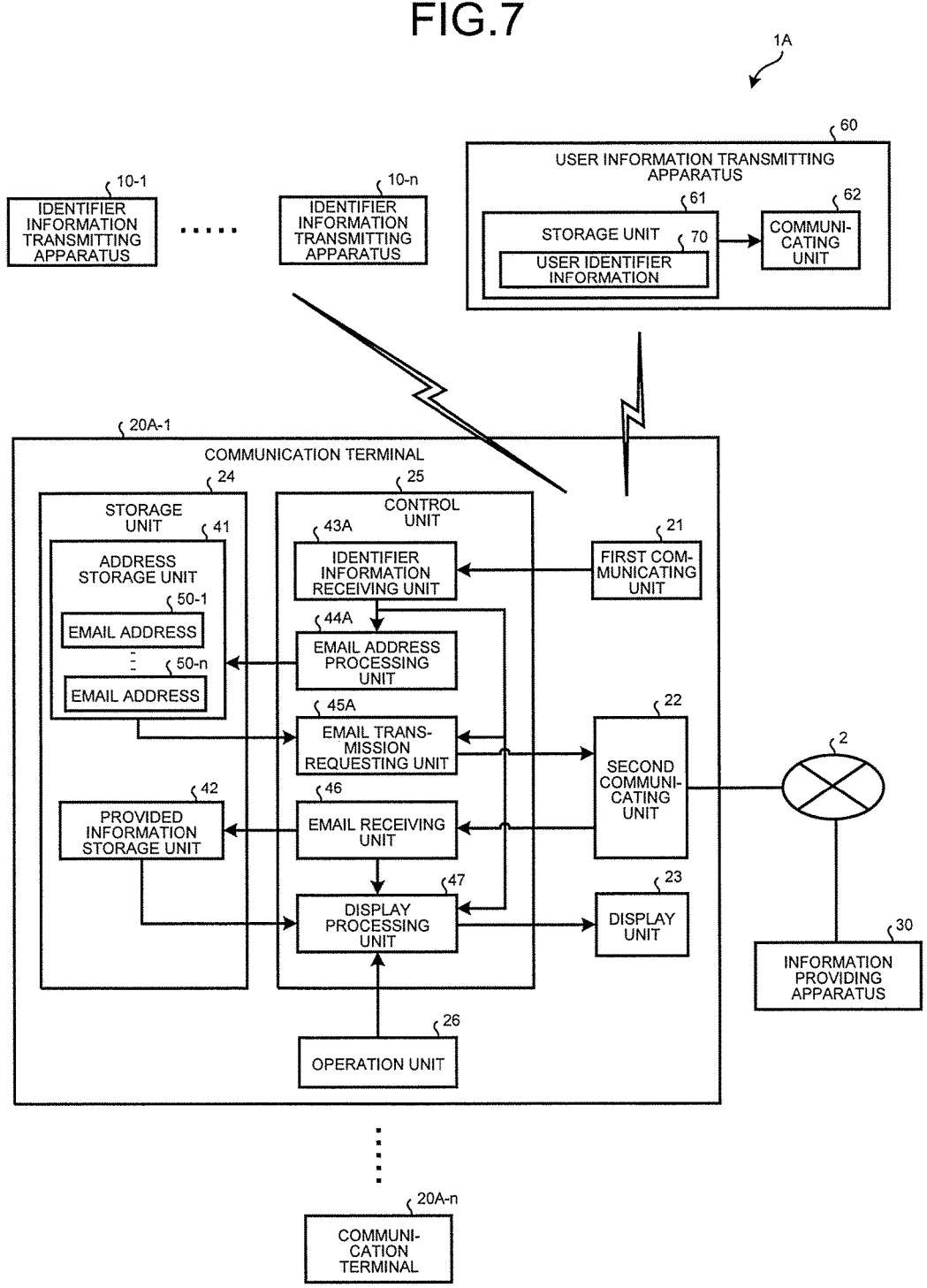
FIG. 7 is a schematic illustrating a configuration of an information processing system according to another embodiment of the present invention.

FIG. 7 is a schematic illustrating a configuration of an information processing system 1A according to another embodiment of the present invention. Mainly explained below are the differences with respect to the information processing system 1 illustrated in FIG. 2, and the elements having the same functions as those in the information processing system 1 are given the same reference numerals, and the explanations thereof are omitted as appropriate. As illustrated in FIG. 7, the information processing system 1A includes the identifier information transmitting apparatuses 10-1 to 10*n*, communication terminals 20A-1 to 20A-n (hereinafter, collectively referred to as a communication terminal 20A), the information providing apparatus 30, and the user information transmitting apparatus 60.

The user information transmitting apparatus 60 includes a storage unit 61 and a communicating unit 62, in the same manner as the identifier information transmitting apparatus 10. Stored in the storage unit 61 is user identifier information 70 which is the identifier information corresponding to the user of the communication terminal 20A. The communicating unit 62 has the same configuration as the communicating unit 12, for example, and periodically transmits the user identifier information 70 stored in the storage unit 61 (for example, once every second) via wireless communication such as Bluetooth or RFID, for example. The user information transmitting apparatus 60 may store the user identifier information 70 received by the communicating unit 62 in the storage unit 61.

Some of the functions of the communication terminal 20A illustrated in FIG. 7 are different from those of the communication terminal 20 described above in the way to be described below, for example. For example, an identifier information receiving unit 43A can not only receive the identifier information 40 transmitted from the identifier information transmitting apparatus 10, but also receive the user identifier information 70 transmitted from the user information transmitting apparatus 60.

An email address processing unit 44A not only generates the email address 50 based on the identifier information 40 and stores the email address 50 in the address storage unit 41, but also generates an email address (hereinafter, referred to as a user email address, just for the convenience) based on the user identifier information 70 transmitted from the user information transmitting apparatus 60, and stores the email address in the address storage unit 41. The way in which the email address is generated based on the user identifier information 70 is the same as that in which the email address 50 (hereinafter, referred to as a location email address, just for the convenience) is generated based on the identifier information 40.

An email transmission requesting unit 45A determines that the email acquisition timing has arrived if both of the identifier information 40 and the user identifier information 70 are received by the identifier information receiving unit 43A, and a user has operated an operation unit 26 (e.g., a user has made an operation for acquiring information). If the email transmission requesting unit 45A determines that the email acquisition timing has arrived, the email transmission requesting unit 45A issues an email transmission request including the user email address and the location email address corresponding to the identifier information 40 and the user identifier information 70, respectively, both of which have been received by the identifier information receiving unit 43.

The phrase "both of the identifier information 40 and the user identifier information 70 are received" does not mean that these pieces of information are received simultaneously in the strict sense, however means that the identifier information 40 and the user identifier information 70 are received within a predetermined time period, for example (e.g., a time period longer than the time intervals at which the identifier information 40 and the user identifier information 70 are transmitted). The email transmission requesting unit 45A may also determine that the email acquisition timing has arrived when both of the identifier information 40 and the user identifier information 70 are received by the identifier information receiving unit 43A, regardless of whether the user has operated the operation unit 26.

The email transmission request receiving unit 54 in the information providing apparatus 30 identifies the user identifier information 70 in the user email address included in the email transmission request. The storage unit 32 stores therein user identifier information of users permitted to acquire emails, and the email transmission request receiving unit 54 can accept the email transmission request only when user identifier information matching the identified user identifier information 70 is stored in the storage unit 32, for example.

If no user identifier information matching the identified user identifier information 70 is stored in the storage unit 32, the control unit 33 neither accepts the email transmission request, nor transmits the email to the communication terminal 20A. In the manner described above, the user email address can be used in authentication performed by the information providing apparatus 30.

The attribute determining unit 55 in the information providing apparatus 30 identifies the identifier information 40 in the email address 50 included in the email transmission request, and acquires the attribute information corresponding to the identifier information 40 (such as the patient ID or the cared person ID) from the attribute information storage unit 51. The control unit 33 then acquires the provided information corresponding to the attribute information (such as the medical examination information of the patient, or the care information of the person to be cared) from the provided information storage unit 52, and transmits an email including the acquired provided information in the body of the email or as an attachment file to the communication terminal 20A. The communication terminal 20A displays the provided information included in the email received from the information providing apparatus 30, onto the display unit 23.

In the manner described above, in the information processing system 1A, an email is acquired based on the email address including the identifier information 40, and on another email address including the user identifier information 70. Therefore, when the identifier information transmitting apparatus 10 is installed in the patient room, for example, a nurse visiting the patient room and nursing the patient can look at the medical record of the patient on the communication terminal 20A, by carrying the user information transmitting apparatus 60. Furthermore, when the identifier information transmitting apparatus 10 is installed in an office, for example, a worker visiting the office can look at information on the office where the worker has visited, on the communication terminal 20A, by carrying the user information transmitting apparatus 60.

The control unit 33 in the information providing apparatus 30 may also acquire the provided information corresponding to the user identifier information 70 and the identifier information 40 included in the email transmission request, from the storage unit 32, and transmit an email including the acquired provided information in the body of the email or as an attachment file to the communication terminal 20A. For example, the control unit 33 may transmit information (hereinafter, referred to as writing information) for allowing the user corresponding to the user identifier information 70 to write information (e.g., medical examination information or care information) related to a person whose information is to be used (such as a patient or a person to be cared) corresponding to the identifier information 40, to the communication terminal 20A via an email.

It is also possible for the email transmission requesting unit 45A not to issue an email transmission request when both of the identifier information 40 and the user identifier information 70 have not been received by the identifier information receiving unit 43A.

Some embodiments of the present invention are explained in detail above with reference to some drawings; however these embodiments are provided by way of examples only, and other embodiments with various modifications and improvements can be made based on the knowledge of those skilled in the art, in addition to the embodiment described in Description of Embodiments.

REFERENCE SIGNS LIST

1, 1A information processing system
10-1 to 10-*n*, 10 identifier information transmitting apparatus
20-1 to 20-*n*, 20, 20A-1, 20A-n, 20A communication terminal
30 information providing apparatus
21 first communicating unit
22 second communicating unit
23 display unit
24 storage unit
25 control unit
26 operation unit
41 address storage unit
42 provided information storage unit
43 identifier information receiving unit
44 email address processing unit
45, 45A email transmission requesting unit
46 email receiving unit
47 display processing unit
51 attribute information storage unit
52 provided information storage unit
53 provided information receiving unit
54 email transmission request receiving unit
55 attribute determining unit
56 provided information transmitting unit

The invention claimed is:

1. An information processing system comprising:
a communication terminal that performs wireless communication;
a plurality of identifier information transmitting apparatuses that is installed in a plurality of respective locations, and each of which repeatedly transmits different identifier information by wireless communication; and
an information providing apparatus that is communicatively connected to provide information to the communication terminal,
the communication terminal including a processor, the processor programmed to:
in response to the communication terminal entering a wireless communication range of the identifier information transmitting apparatuses, receive the identifier information transmitted from the identifier information transmitting apparatuses by the wireless communication;
generate an email address in which the received identifier information is included as a part of the email address;
upon an acquirement interval being reached, transmit an email transmission request that includes the generated email address to the information providing apparatus;
acquire an email that is addressed to the generated email address from the information transmitting apparatus; and
present information provided in the email from the information providing apparatus to a user of the communication terminal,
the information providing apparatus includes:
a memory that stores:
identifier information of the identifier information transmitting apparatuses and attribute information of the identifier information transmitting apparatuses in a manner associated with each other; and provided information and attribute information in a manner associated with each other; and a processor programmed to:

receive the email transmission request from the communication terminal;

identify the identifier information in the email address included in the received email transmission request;

acquire attribute information corresponding to the identified identifier information, from the memory;

acquire provided information corresponding to the acquired attribute information, from the memory; and transmit an email including the acquired provided information in a body of the email or as an attachment file to the communication terminal, wherein:

the identifier information is unique for each of the plurality of the identifier information transmitting apparatuses and includes at least one of an organization, an operator, location, or product that is associated with one of the plurality of identifier information transmission apparatuses; and the provided information includes at least one of characters, a still image, or a video.

2. The information processing system according to claim 1, wherein the processor of the communication terminal is further programmed to:

when the identifier information is not received from the identifier information transmitting apparatus, determine whether a predetermined time period has elapsed since the email address is generated, and in response to determining that the predetermined time has elapsed since the email address is generated, erase the email address.

3. The information processing system according to claim 2, wherein the processor of the communication terminal is further programmed to make the predetermined time period longer as a reception count of the identifier information is greater.

4. The information processing system according to claim 1, further comprising:

a user information transmitting apparatus that repeatedly transmits, by wireless communication, user identifier information that is identifier information assigned to the user of the communication terminal, and corresponding to the user, wherein when the communication terminal is in a communication area of the user information transmitting apparatus, the processor is further programmed to:

receive the user identifier information transmitted from the user information transmitting apparatus;

generate an email address including the received user; and acquire an email that is addressed to the email address, based on an email address including the identifier information and an email address including the user identifier information.

5. The information processing system according to claim 1, wherein the processor of the communication terminal is further programmed to make the acquirement interval of the email shorter as a reception count of the identifier information is greater.

6. The information processing system according to claim 1, wherein the processor of the communication terminal is further programmed to make the acquirement interval of the email shorter as a distance from the identifier information transmitting apparatus to the communication terminal is shorter.

7. The information processing system according to claim 1, wherein the identifier information transmitting apparatus is provided in an unattended servicing apparatus, and the identifier information transmitting apparatus sends the identifier information in response to a request from the unattended servicing apparatus.

8. The information processing system according to claim 1, wherein an unattended servicing apparatus includes a vending machine, and the identifier information transmitting apparatus sends the identifier information at a timing at which a product of the vending machine is purchased.

* * * * *